US008161099B2

(12) United States Patent
Stich et al.

(10) Patent No.: US 8,161,099 B2
(45) Date of Patent: Apr. 17, 2012

(54) TECHNIQUES TO AUTOMATICALLY SYNDICATE CONTENT OVER A NETWORK

(75) Inventors: Christian E. Stich, Mercer Island, WA (US); Gareth Howell, Bothell, WA (US); Tristan Davis, Redmond, WA (US); Dan Parish, Kirkland, WA (US); Eran Megiddo, Bellevue, WA (US); Sherman Der, Redmond, WA (US); Jeff Rambharack, Ottawa (CA)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 12/337,463

(22) Filed: Dec. 17, 2008

(65) Prior Publication Data

US 2010/0153486 A1 Jun. 17, 2010

(51) Int. Cl.
*G06F 15/16* (2006.01)
*G06F 17/00* (2006.01)

(52) U.S. Cl. ........ 709/203; 709/229; 709/201; 709/206; 715/713; 715/811; 715/745; 715/234; 715/733; 715/239; 715/864

(58) Field of Classification Search .................. 709/203, 709/206, 229, 201
See application file for complete search history.

(56) References Cited

U.S. PATENT DOCUMENTS

| | | | |
|---|---|---|---|
| 6,961,713 | B2 | 11/2005 | Perkowski |
| 2002/0087660 | A1 | 7/2002 | Martin et al. |
| 2003/0110106 | A1 | 6/2003 | Deshpande et al. |
| 2005/0273503 | A1 | 12/2005 | Carr et al. |
| 2006/0004703 | A1 | 1/2006 | Spivack et al. |
| 2006/0165040 | A1 | 7/2006 | Rathod et al. |
| 2008/0021963 | A1 | 1/2008 | Jana et al. |
| 2008/0133510 | A1 | 6/2008 | Timmons |
| 2008/0147780 | A1 | 6/2008 | Trevor et al. |
| 2008/0195664 | A1* | 8/2008 | Maharajh et al. .......... 707/104.1 |
| 2008/0228545 | A1 | 9/2008 | Jiang |
| 2009/0030774 | A1* | 1/2009 | Rothschild et al. ............. 705/10 |
| 2009/0292680 | A1* | 11/2009 | Sabnani ........................... 707/3 |

OTHER PUBLICATIONS

PCT/US2009/063893, International Search Report and Written Opinion, Mailed Jun. 21, 2010, 11 pages.
"Integrated Collaboration Tools", "Lotus Software", Retrieved at<<http://www-01.ibm.com/software/lotus/products/notes/productivitytools.html>>, Sep. 25, 2008, pp. 5.
"Thor Technologies Unveils Xellerate Enterprise for Automated Provisioning of Personalized Suites of Web-Based Services, Applications and Resources", Retrieved at<<http://findarticles.com/p/articles/mi_m0EIN/is_2001_March_12/ai_71555183/pg_1>>, New York—(Business Wire)—Mar. 12, 2001, pp. 2. "The New Face of Collaboration: An Overview of Enterprise-Capable Collaboration Software", Retrieved at<<http://www.processor.com/editorial/article.asp?article=articles%2Fp2919%2F22p19.asp>>, May 11, 2007 • vol. 29 Issue 19, pp. 4.
"Syndication and the Live Web Economy", Retrieved at<<http://www.linuxjournal.com/article/8731>>, Dec. 9, 2005, Linux Journal, pp. 6.

* cited by examiner

*Primary Examiner* — Jude Jean Gilles (57) ABSTRACT

Techniques to automatically syndicate content over a network are described. An apparatus may comprise a client computer having a processing system with a processor and computer-readable medium. The computer readable medium may store program instructions for a syndication manager component communicatively coupled to a content producing component arranged to be executed by the processor. The syndication manager component may be operative to receive syndication content from the content producing component, and provide a syndication dialog through the content producing component to syndicate the syndication content using a content delivery platform. The syndication manager component may also syndicate the syndication content to form a syndication resource accessible from the content delivery platform over a network using a syndication referent. Other embodiments are described and claimed.

20 Claims, 8 Drawing Sheets

RECEIVE SYNDICATION CONTENT FROM A CONTENT PRODUCING COMPONENT ARRANGED FOR EXECUTION BY A CLIENT COMPUTER
502

PROVIDE A SYNDICATION DIALOG THROUGH THE CONTENT PRODUCING COMPONENT TO SYNDICATE THE SYNDICATION CONTENT USING A CONTENT DELIVERY PLATFORM
504

SYNDICATE THE SYNDICATION CONTENT TO FORM A SYNDICATION RESOURCE ACCESSIBLE FROM THE CONTENT DELIVERY PLATFORM OVER A NETWORK USING A SYNDICATION REFERENT
506

TECHNIQUES TO AUTOMATICALLY SYNDICATE CONTENT OVER A NETWORK

BACKGROUND

Web syndication is a form of syndication in which website material is made available to multiple other sites. Most commonly, web syndication refers to making web feeds available from a site in order to provide other people with a summary of the website's recently added content, such as the latest news or forum posts. Syndication benefits both the websites providing information and the websites displaying it. For the receiving site, content syndication is an effective way of adding greater depth and immediacy of information to its pages, making it more attractive to users. For the transmitting site, syndication drives exposure across numerous online platforms. This generates new traffic for the transmitting site, thereby making syndication a free and easy form of advertisement. Syndicating content, however, is typically a complicated process that forces a user to engage in multiple manual operations, sometimes across multiple applications and devices. This complexity potentially limits accessibility and usefulness of syndicating content over a network. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to automatically perform syndication. Some embodiments are particularly directed to enhanced syndication techniques to automatically manage syndication of content for distribution and access across multiple online platforms.

In one embodiment, for example, an apparatus may comprise a client computer having a processing system. The processing system may comprise, among other elements, a processor and some form of memory or computer-readable medium. The computer readable medium may store program instructions for a syndication manager component communicatively coupled to a content producing component arranged to be executed by the processor. The syndication manager component may be operative to receive syndication content from the content producing component, and provide a syndication dialog through the content producing component to syndicate the syndication content using a content delivery platform. The syndication manager component may also syndicate the syndication content to form a syndication resource accessible from the content delivery platform over a network using a syndication referent. The syndication referent may then be published online, and used to access the syndication resource stored by the content delivery platform. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to enhanced syndication techniques to automatically manage syndication of content for distribution and access across multiple online platforms. The enhanced syndication techniques may be implemented using a single integrated application to make content available for syndication. The single integrated application may also provide a syndication referent to access the syndicated content stored on a network accessible device. In particular, the enhanced syndication techniques may be implemented as part of an application program used to retrieve, generate, store or manage syndication content, thereby allowing a content producer to syndicate the syndication content without having to leave the context provided by the application program. The enhanced syndication techniques may also automate and simplify some or all of the operations needed to syndicate content, which are typically performed manually across different threads, processes or devices. As a result, the embodiments can improve affordability, scalability, modularity, extendibility, or interoperability for an operator, device or network.

Figure 1:
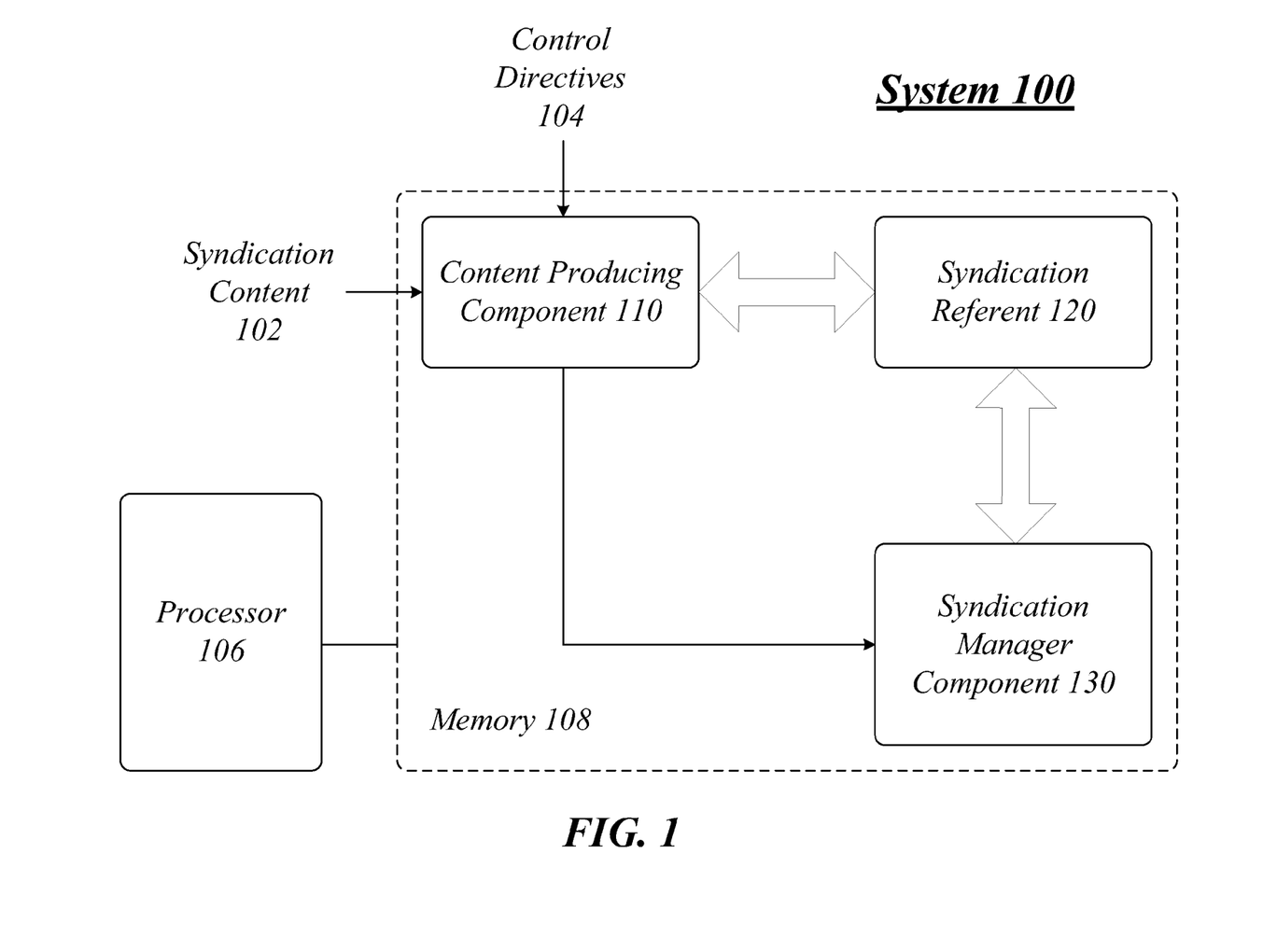
FIG. 1 illustrates an embodiment of a first system.

FIG. 1 illustrates a block diagram for a system 100 to syndicate content for dissemination across multiple online platforms. In one embodiment, for example, the system 100 may comprise a computer-implemented system 100 having multiple components 110, 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium and/or semiconductor), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, vehicle communications system, vehicle entertainment system, home entertainment system, video games, gaming system, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the system 100 may be implemented as part of a client computer or a server system, each having a processing system with a processor 106 and a computer-readable medium, such as memory 108. The memory 108 may store program instructions for a content producing component 110, and a syndication manager component 130 communicatively coupled to the content producing component 110. The components 110, 130 may be arranged for execution by the processor 106.

The content producing component 110 may generally comprise any software program arranged to retrieve, generate or manage any form of multimedia content for a content producer. In one embodiment, the content producing component 110 may comprise a productivity application program, such as from among a suite of stand-alone or interrelated productivity application programs offered as part of MICROSOFT® OFFICE made by MICROSOFT CORPORATION, Redmond, Wash. Examples of MICROSOFT OFFICE productivity application programs may include without limitation MICROSOFT WORD, EXCEL®, POWERPOINT®, OUTLOOK®, PUBLISHER, ACCESS®, INFOPATH®, GROOVE®, ONENOTE®, COMMUNICATOR, VISIO®, and so forth. In one embodiment, the content producing component 110 may comprise a content management system (CMS) used to create, edit, manage, and publish content in a consistently organized fashion. The embodiments are not limited, however, to these examples.

The content producing component 110 may be used to retrieve, generate or manage content for a content producer. A content producer may comprise, for example, an operator or user that retrieves, generates or produces syndication content 102. Additionally or alternatively, the content producer does not have to be a human being, but can be an automated system. Content production and syndication may be fully or partially automated. For example, the syndication manager component 130 may have an API to be used in an automated manner.

The syndication content 102 may comprise any form of multimedia content suitable for syndication, such as electronic documents (e.g., application documents, spreadsheets, presentations, etc.), references, referents, objects, images, pictures, files, video files, audio files, media files, text, symbols, items, data, metadata, hyperlinks, and so forth. For example, a content producer may use a word processing program to generate syndication content in the form of some or all of a word processing document, or a spreadsheet program to generate syndication content in the form of some or all of a spreadsheet document, and so forth. In other examples, a content producer may retrieve the syndication content 102 such as documents stored by a data store. The data store may comprise, for example, a remote data store (e.g., online server) or a local data store (e.g., hard drive or flash memory). It is worthy to note that while some embodiments may provide mechanisms to designate all of the syndication content 102 for syndication, other embodiments may allow for designation of certain select portions of the syndication content 102 for syndication.

The syndication manager component 130 may generally comprise any software program arranged to automatically syndicate content to a content delivery platform. Syndication may generally refer to delivering content, for free or at a cost, to one or more subscribers. When used in the context of electronic data communications, such as over a public network (e.g., the Internet) or a private network (e.g., an intranet), syndication may be sometimes referred to as web syndication. Web syndication is a form of syndication in which website material is made available to multiple other sites. Most commonly, web syndication refers to making web feeds available from a site in order to provide other people with a summary of the website's recently added content, such as the latest news or forum posts. Syndication benefits both the websites providing information and the websites displaying it. For the receiving site, content syndication is an effective way of adding greater depth and immediacy of information to its pages, making it more attractive to users. For the transmitting site, syndication drives exposure across numerous online platforms. This generates new traffic for the transmitting site, thereby making syndication a free and easy form of advertisement. This also provides various benefits to the user, such as marketing, convenience, public exposure, and so forth.

Web syndication may be implemented using different web syndication formats. The web syndication formats may include any formats suitable for transport over a given network using a given set of communications protocols. Examples of various web syndication formats may include without limitation a Hypertext Markup Language (HTML) document, an Extensible Markup Language (XML) document, Javascript, Really Simple Syndication (RSS) web feed, Atom Syndication Format, Silverlight/XAML, or links to such documents and other kinds of digital media. The web syndication formats may be transported using any communications protocols suitable for a given network, such as the Hypertext Transfer Protocol (HTTP), Atom Publishing Protocol, or variant for a public network such as the Internet.

One example of a web syndication format is a web feed or news feed. A web feed is a data format used for providing users with frequently updated content. Content distributors syndicate a web feed, thereby allowing users to subscribe to it. Making a collection of web feeds accessible in one spot is known as aggregation, which is typically performed by an Internet aggregator. A web feed is also sometimes referred to as a syndicated feed. In the typical scenario of using web feeds, a content provider publishes a feed link on their site which end users can register with an aggregator program (also called a feed reader or a news reader) running on their own machines. The registration may be as simple as dragging a link from the web browser to the aggregator. When instructed, the aggregator asks all the servers in its feed list if they have new content, and if so, the aggregator either makes a note of the new content or downloads it. Aggregators can be scheduled to check for new content periodically. Web feeds are an example of pull technology, although they may appear to push content to the user. The kinds of content delivered by a web feed are typically webpage content. Often when websites provide web feeds to notify users of content updates, they only include summaries in the web feed rather than the full content itself. Web feeds are operated by many news websites, weblogs (blogs), schools, and podcasters.

Syndicating content, however, is typically a complicated process that forces a user to engage in multiple manual operations, such as signing up for a content delivery platform, performing authentication operations, requesting syndication of specific content, and so forth. For example, conventional syndication techniques cause a user to create an account with an online service that provides for syndication of content. The user then needs to authenticate her identity with the online service, publish the content to the online service, and enable syndication of the content in the online service. These syndication operations are typically perform manually by a user, and can sometimes necessitate the use of different threads, processes or machines. For example, a user may need to generate content with one application, switch to a web browser to access an online service, switch back to the application to upload to the online service, interact with the online service to configure syndication parameters for the content, and so forth. This may be tedious and confusing for a user. This process is further exacerbated when a user desires to publish the syndicated content in a different online service, such as a blog service for updating and publishing content for a blog. As such, this potentially limits accessibility and usefulness of syndication and/or publication techniques.

The system 100 is designed to solve these and other problems. In various embodiments, the syndication manager component 130 of the system 100 implements various types of enhanced syndication techniques designed to automate many of the manual operations typically necessary for syndicating content. The syndication manager component 130 may be implemented as a stand-alone software program interoperable with the content producing component 110, as an integrated part of the content producing component 110, or a set of Application Program Interfaces (APIs) accessible by the content producing component 110. The embodiments are not limited, however, to these exemplary implementations.

The syndication manager component 130 may syndicate content using any suitable online syndication service, such as provided by a content delivery platform, a content delivery network or a content distribution network. A content delivery platform may comprise appropriate hardware and/or software to implement a syndication service, with the syndication service arranged to syndicate the syndication content 102 for access by multiple online platforms. The syndication content 102 as stored by the content delivery platform (e.g., as a syndication resource), may be accessed online through a network, such as by a computer with a web browser. A content delivery platform may be implemented as part of a server executing various types of server applications, such as a web server providing web services available over a network. In one embodiment, for example, a content delivery platform may be implemented as a Software as a Service (SaaS) content service, similar to a content management system (CMS), that utilizes embedded software code to deliver web content. Instead of the installation of software on client servers, a content delivery platform feeds content through embedded code snippets, typically via a JavaScript widget, Flash widget or server-side Ajax (programming). A content delivery platform is utilized for all types of web content, even text-based content. Additionally or alternatively, a content delivery platform can be utilized to import a variety of syndicated content into one central location and then re-purposed for web syndication. Examples of content delivery platforms may include without limitation MICROSOFT OFFICE LIVE WORKSPACE, WINDOWS LIVE™, WINDOWS LIVE SPACES, and so forth. The embodiments are not limited, however, to these examples.

In general operation, the syndication manager component 130 may be operative to receive syndication content 102 from the content producing component 110. The syndication manager component 130 may provide a syndication dialog through the content producing component 110 to syndicate the syndication content 102 using a content delivery platform. The syndication manager component 130 may also syndicate the syndication content 102 to form a syndication resource accessible from the content delivery platform over a network using a syndication referent 120.

The syndication referent 120 may comprise part of a relationship or association between objects. In particular, the syndication referent 120 may be used to provide access to the syndication content 102 from a content delivery platform. When the syndicated content 102 is stored and ready for delivery by the content delivery platform, the syndicated content 102 may sometimes be referred to herein as a syndicated resource. The syndication referent 120 may represent a link to the syndication resource accessible from the content delivery platform. Examples for the syndication referent 120 may include without limitation a uniform resource identifier (URI), a uniform resource locator (URL), a uniform resource name (URN), executable software code (e.g., HTML or XML code), a hyperlink, or any combination thereof. The embodiments are not limited in this context.

In various embodiments, the syndication referent 120 may be generated by the system 100 or a content delivery platform. In the former case, the syndication manager component 130 may generate the syndication referent 120 sometime during interactive syndication operations with a content delivery platform, and deliver the syndication referent 120 to the content producing component 110 and the content delivery platform. In the latter case, a content delivery platform may generate the syndication referent 120, and forward the syndication referent 120 to the syndication manager component 130, which transfers the syndication referent 120 to the content producing component 110.

The syndication manager component 130 may also be operative to receive a control directive 104 from a content producer (via an input device) to initiate a syndication dialog delivered through the content producing component 110. The syndication dialog may be designed to present information related to syndication operations in a manner that guides the content producer through the various options available for syndicating the syndication content 102. The syndication dialog may also prompt a content producer for certain information needed to perform syndication of the syndication content 102, such as creating or selecting a content delivery platform or a particular operator account for a content delivery platform. The syndication dialog may also be designed to receive commands, control directives and other inputs from the content producer, and forward the user inputs to the appropriate components, application and devices. The syndication dialog may be generated natively by the content producing component 110, by the syndication manager component 130 and delivered through the content producing component 110, or by a content delivery platform and delivered through the components 110, 130.

The syndication manager component 130 may present the syndication dialog to access a content delivery platform through the content producing component 110. In this manner, a content producer may use the same user interface tools, context, and operating environment as the content producing component 110, thereby reducing the need to utilize different applications to syndicate the syndication content 102. By way of contrast, conventional techniques typically force a content producer to utilize a separate network interface, such as a web browser, to access some or all of the features offered by a content delivery platform. By implementing enhanced syndication techniques within a single application and not through a web browser, the syndication manager component 130 allows the content producing component 110 to offer a more integrated and seamless mechanism for syndicating the syndication content 102, thereby decreasing complexity and increasing ease-of-use for the content producer.

The syndication manager component 130 may generate an operator account for the content producer that is associated with a content delivery platform for use in syndicating the syndication content 102 by the content delivery platform. Additionally or alternatively, the syndication manager component 130 may receive a control directive 104 to select an existing operator account for the content producer associated with a content delivery platform when the operator account has already been generated. Although some embodiments are described using an operator account for syndication, it may be appreciated that syndication may be performed using a shared network location that does not need an operator account.

The syndication manager component 130 may be further operative to perform authentication operations to access the content delivery platform through the content producing component 110. Many online services, including content delivery platforms, implementing security procedures such as authentication procedures designed to establish or confirm an identity for a subscriber to the online services. This may include, for example, a login name and a security password. The authentication operations are typically performed using a web browser. The syndication manager component 130, however, may be designed to perform authentication operations for a content delivery platform from within the content producing component 110, thereby allowing a content producer to remain within the context of the content producing component 110. This may reduce confusion and complexity for the content producer. Additionally or alternatively, the syndication manager component 130 may automatically perform the appropriate authentication operations for a given content delivery platform, such as automatically retrieving a login name and password from a secure location, and providing the login name and the security password to the content delivery platform to authenticate the content producer.

The syndication manager component 130 may be further operative to translate the syndication content 102 from a first format to a second format suitable for syndication by a given content delivery platform. The syndication content 102 may have various types of display formats, some of which may be incompatible with a content delivery platform. In such cases, the syndication manager component 130 may translate the syndication content 102 to the appropriate display format used by the content delivery platform. For example, a word processing document may be converted between different word processing formats suitable for different word processing programs, a spreadsheet document may be converted between different spreadsheet formats for different spreadsheet programs, a document may be converted to an image file (e.g., PNG, TIFF, PDF), and so forth. A content delivery platform may also use different web syndication formats. The syndication manager component 130 may translate the syndication content 102 to the appropriate web syndication format used by the content delivery platform. For example, the syndication content 102 may be translated between an HTML document and an XML document, or between a format suitable for a RSS web feed and a format suitable for an Atom web feed. Any number of formats for any number of content producing applications and/or content delivery platforms may be supported by the syndication manager component 130 as desired for a given implementation. It may be appreciated that these translation operations may be performed by the syndication manager component 130, or the content delivery platform. The embodiments are not limited in this context.

Figure 2:
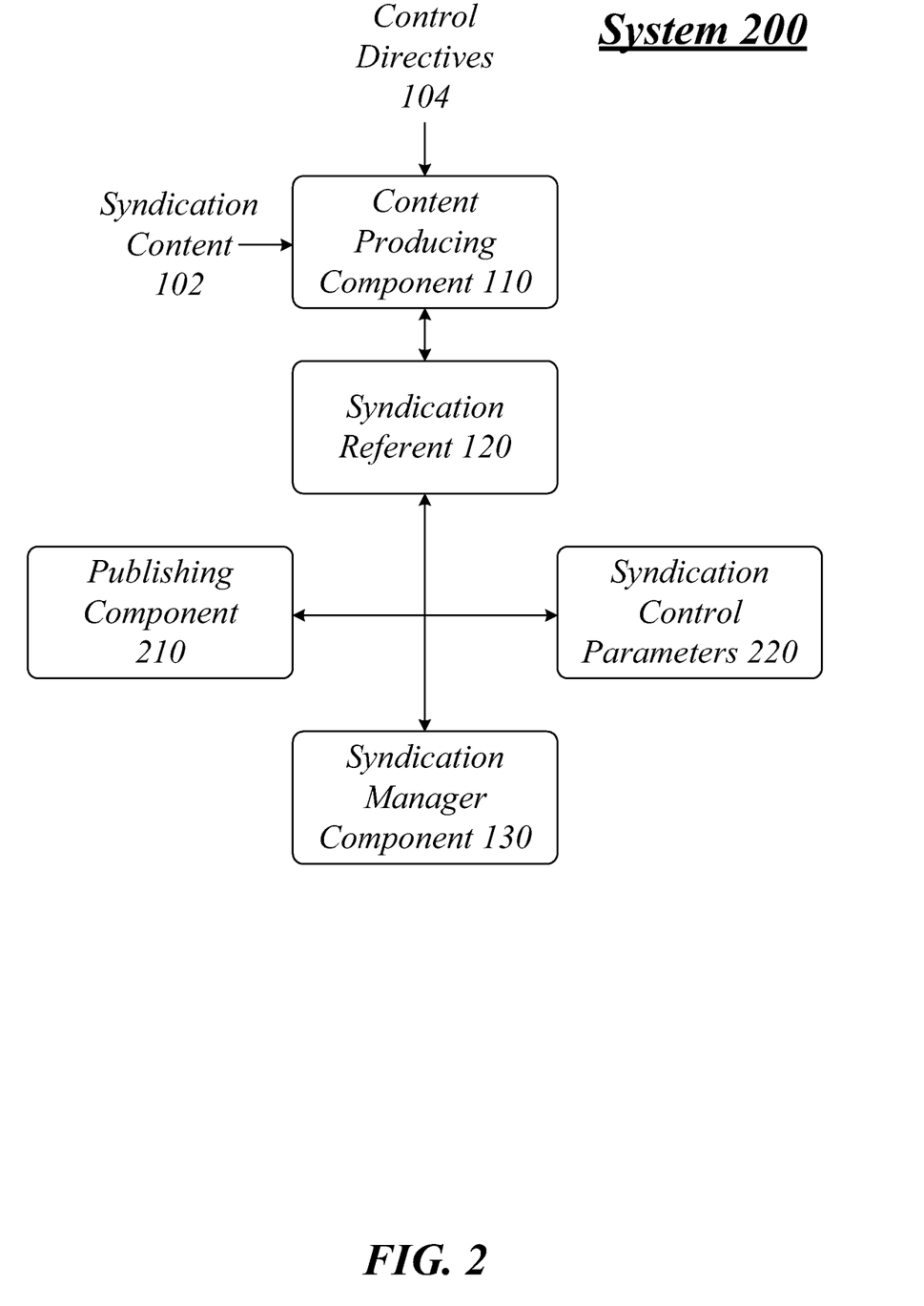
FIG. 2 illustrates an embodiment of a second system.

FIG. 2 illustrates a block diagram of a system 200 to syndicate and publish content for dissemination across multiple online platforms. The system 200 may be similar to the system 100, and may further comprise a publishing component 210 and a data store for various syndication control parameters 220.

In the illustrated embodiment shown in FIG. 2, the publishing component 210 may be communicatively coupled to the content producing component 110 and the syndication manager component 130. The publishing component 210 may be operative to publish the syndication referent 120 using a publishing application executed by a server computer. The publishing application may comprise any online service suitable for publishing content. For example, the publishing application may comprise a web site hosting a weblog (blog). The publishing component 210 may automatically publish the syndication referent 120 to the publication application. For example, an entity may cause sales figures to be syndicated at defined time intervals (e.g., weekly, monthly, quarterly, yearly, etc.). Additionally or alternatively, a content producer may use control directives 104 to cause the publishing component 210 to publish the syndication reference 120 to the publication application, such as using cut-and-paste tools, drag-and-drop tools, and other graphical user interface (GUI) tools for moving or transferring information between threads, processes or machines.

The syndication manager component 130 may be operative to send syndication control parameters 220 to control syndication operations performed by the content delivery platform from the content producing component 110 to the content delivery platform. The syndication control parameters 220 may control how the syndication content 102 is syndicated by the content delivery platform. For example, the syndication control parameters 220 may include a syndication portion identifier representing how much of the syndication content 102 (all or portions) should actually be syndicated. In another example, the syndication control parameters 220 may include other parameters for control a level of interactivity, sizing, display, effects, and so forth. In yet another example, the syndication control parameters 220 may be designed to affect the syndication content 102, such as setting a parameter in an Excel workbook during the syndication dialog.

Figure 3:
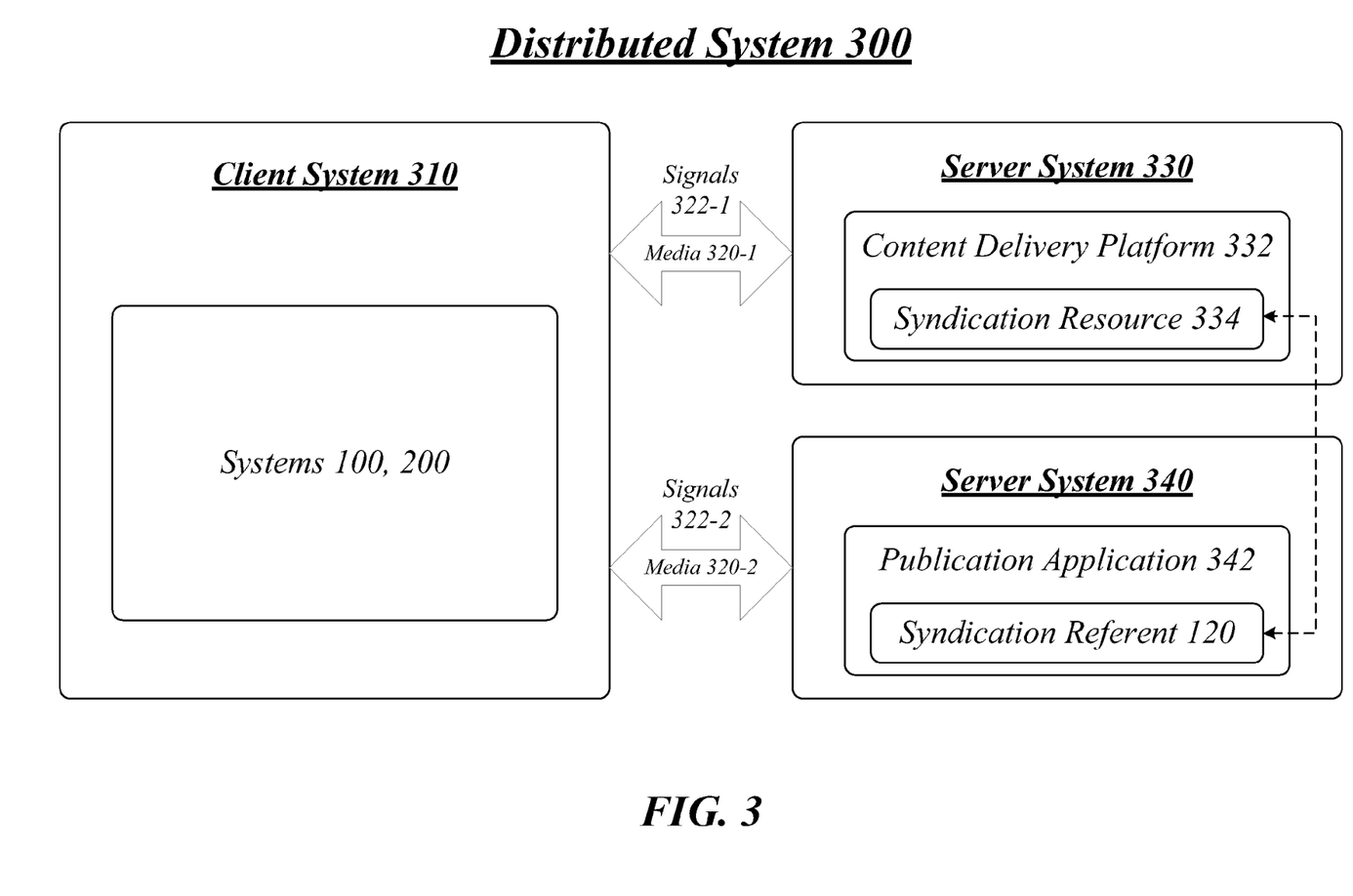
FIG. 3 illustrates an embodiment of a distributed system.

FIG. 3 illustrates a block diagram of a distributed system 300. The distributed system 300 may distribute portions of the structure and/or operations for the systems 100, 200 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement, among other elements, the system 100. A server system 330 may implement, among other elements, a content delivery platform 332. The content delivery platform 332 may further include a syndication resource 334. A server system 340 may implement, among other elements, a publication application 342. The publication application 342 may further include the syndication referent 120.

The client system 310 and the respective server systems 330, 340 may communicate with each over respective communications media 320-1, 320-2 using respective communications signals 322-1, 322-2. In one embodiment, for example, the communications media 320-1, 320-2 may comprise wired or wireless communications media. In one embodiment, the communications signals 322-1 may comprise syndication messages having syndication information and communicated between the syndication manager component 130 and the content delivery platform 332. For example, the syndication messages may include control directives for the content delivery platform 332, the syndication content 102, one or more syndication control parameters 222, and so forth. In one embodiment, the communications signals 322-2 may comprise publishing messages having publishing information and communicated between the publishing component 210 and the publication application 342. For example, the publishing messages may include control directives for the publication application 342, the syndication referent 120, and so forth.

In one embodiment, the content delivery platform 332 may receive the syndication content 102, and store the syndication content 102 as a syndication resource 334 by the content delivery platform 332. The content delivery platform 332 and/or the syndication manager component 130 may optionally translate the syndication content 102 between different formats, such as display formats, web syndication formats, and so forth. The syndication resource 334 may be accessed by other electronic devices using the syndication referent 120, or other reference techniques.

Figure 4:
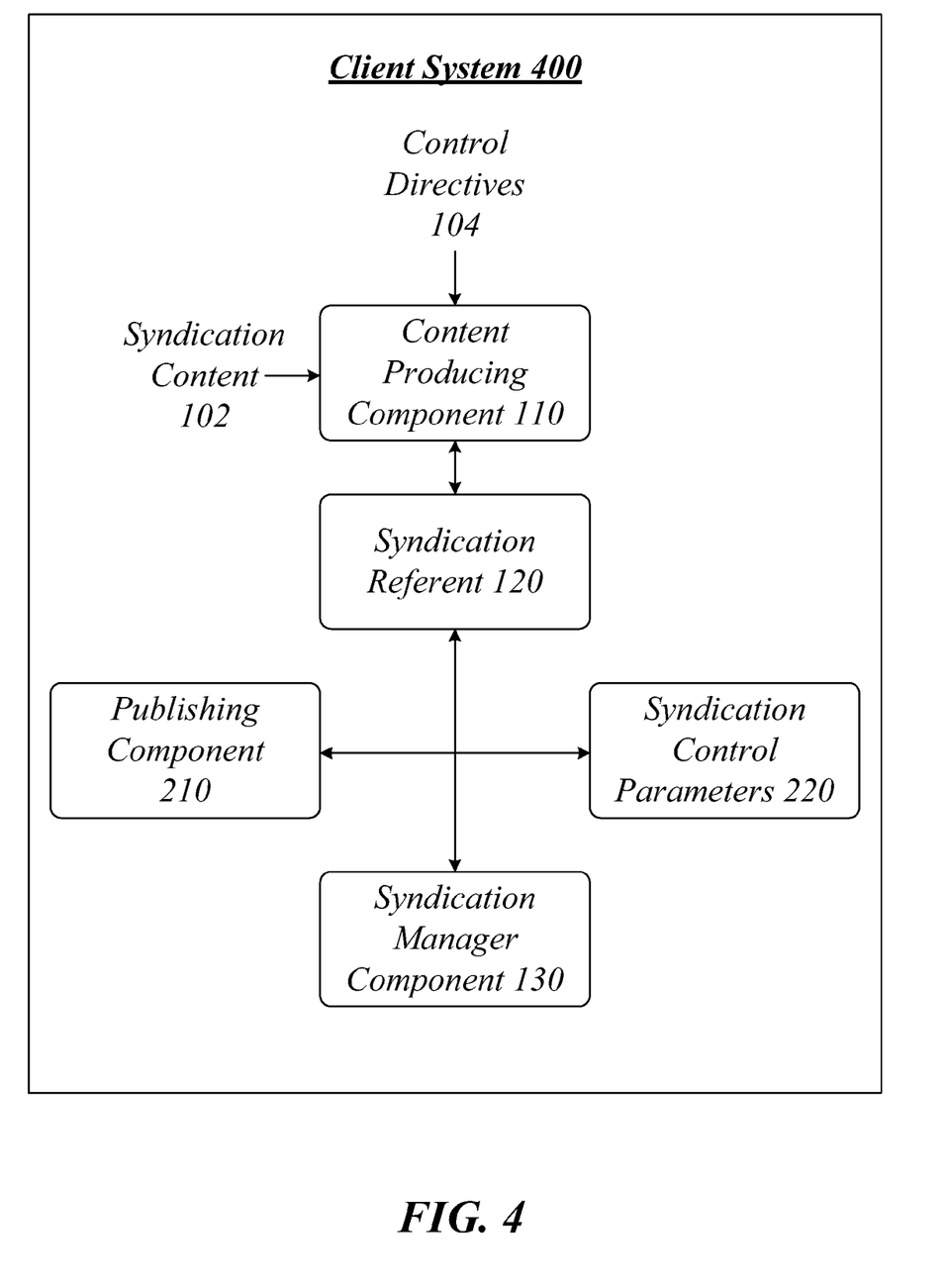
FIG. 4 illustrates an embodiment of a centralized system.

FIG. 4 illustrates a block diagram of a centralized system 400. The centralized system 400 may implement all of the structure and/or operations for the systems 100, 200 in a single computing entity. In one embodiment, for example, the centralized system 400 may implement the structure and/or operations for the systems 100, 200 entirely within a single computing device.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
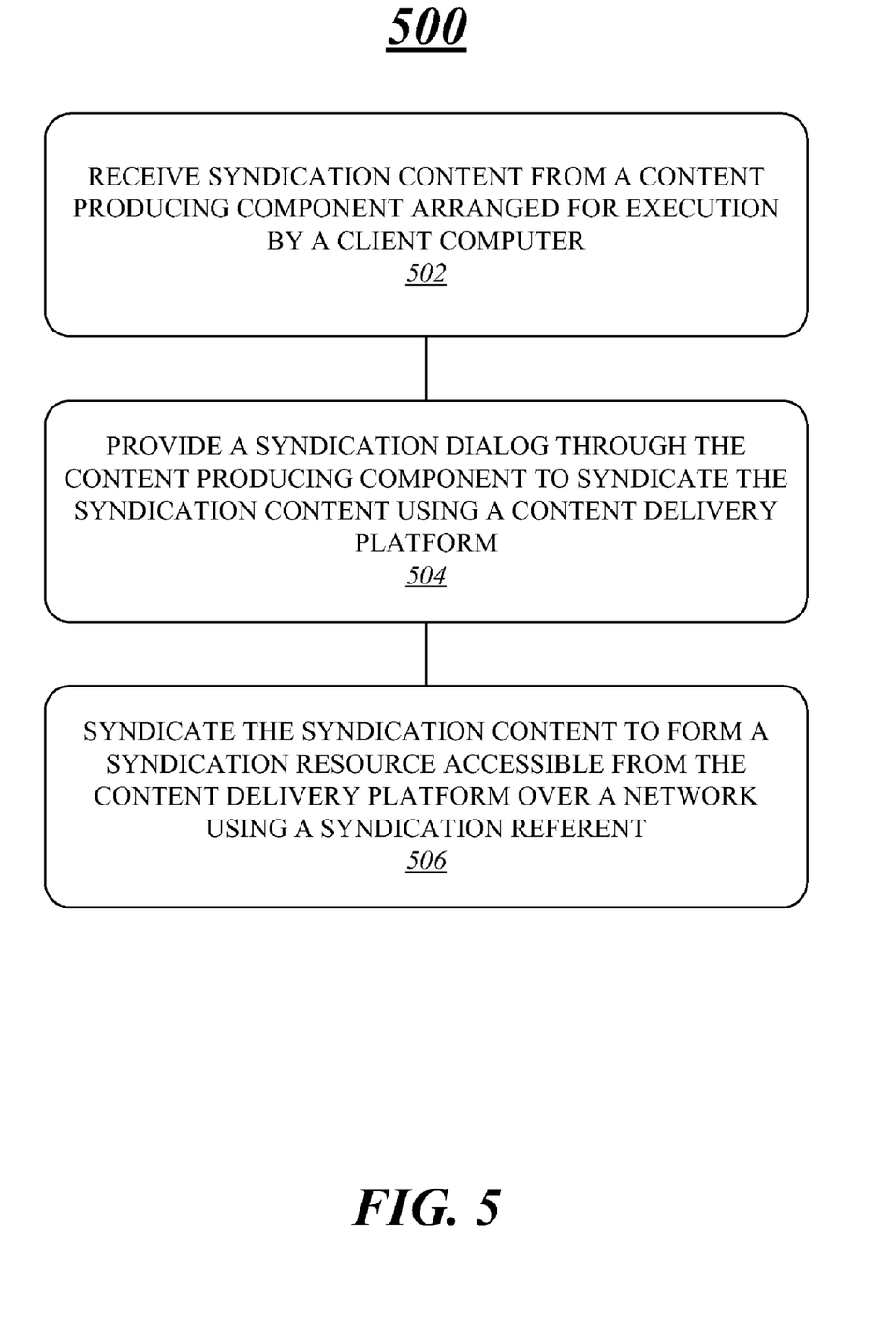
FIG. 5 illustrates an embodiment of a first logic flow.

FIG. 5 illustrates one embodiment of a logic flow 500. The logic flow 500 may be representative of some or all of the operations executed by one or more embodiments described herein, such as the systems 100, 200.

In the illustrated embodiment shown in FIG. 5, the logic flow 500 may receive syndication content from a content producing component arranged for execution by a client computer at block 502. For example, the client system 300 may include the system 100 comprising the content producing component 110 and the syndication manager component 130. A content producer may use the content producing component 110 to retrieve the syndication content 102 from a local data store or a remote data store. The content producer may also use the content producing component 110 to generate the syndication content 102. The syndication manager component 130 may receive the syndication content 102 from the content producing component 110.

The logic flow 500 may provide a syndication dialog through the content producing component to syndicate the syndication content using a content delivery platform at block 504. For example, the content producer may desire to syndicate the syndication content 102. The content producer may utilize a GUI for the content producing component 110 to send control directives 104 to the content producing component 110 to initiate operations for the syndication manager component 130. The syndication manager component 130 may provide a syndication dialog through the content producing component 110 to initiate syndication operations needed to syndicate the syndication content 102 using the content delivery platform 332. The syndication dialog may request information from the content producer to interact with the content delivery platform 332, and convey the information to the content delivery platform 332 on behalf of the content producer and the content producing component 110.

The logic flow 500 may syndicate the syndication content to form a syndication resource accessible from the content delivery platform over a network using a syndication referent at block 506. For example, the syndication manager component 130 may syndicate the syndication content 102 to form the syndication resource 334 accessible from the content delivery platform 332 over a network (e.g., media 320-1, 320-2) using the syndication referent 120. For example, a viewing user may activate the syndication referent 120 (e.g., select and click) to retrieve, access or view the syndication resource 334. The syndication manager component 130, or the content delivery platform 332, may do some work to make the syndication content 102 to make it more suitable for syndication, such as generating HTML, JavaScript, XAML, resizing objects, and so forth.

In addition to automatically syndicating the syndication content 102 to the content delivery platform 332, the syndication manager component 130 may use a syndication dialog to modify the syndication content 102 stored by the content delivery platform 332 as the syndication resource 334. For instance, the modifying operations may include republishing the syndication content 102 to the content delivery platform 332, updating the syndication content 102 stored by the content delivery platform 332, or remove some or all of the syndication content 102 from the content delivery platform 332.

Figure 6:
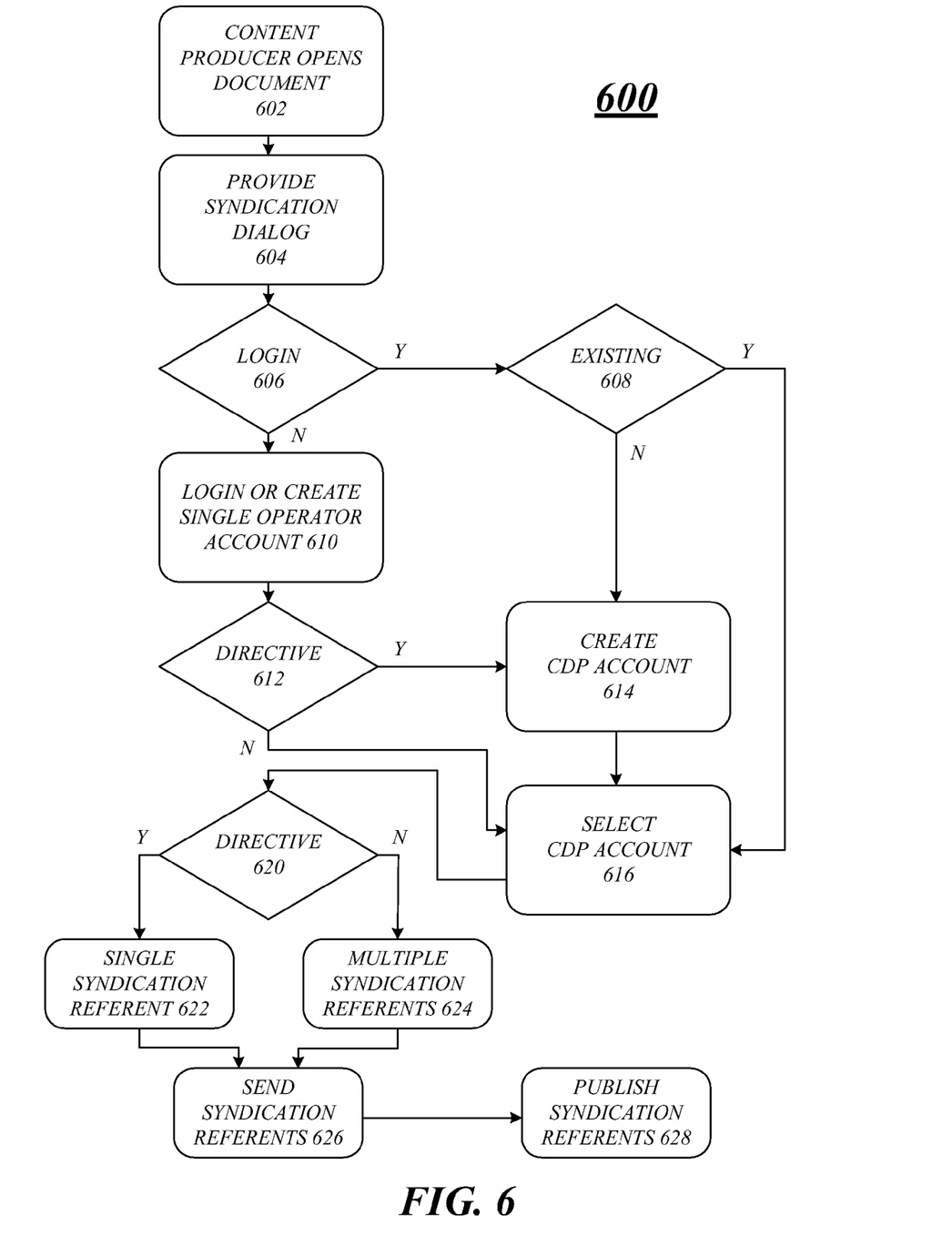
FIG. 6 illustrates an embodiment of a second logic flow.

FIG. 6 illustrates one embodiment of a logic flow 600. The logic flow 600 may be representative of some or all of the operations executed by one or more embodiments described herein. In particular, the logic flow 600 may provide an exemplary implementation for syndication and publication operations performed by the systems 100, 200, 300 or 400.

In the illustrated embodiment shown in FIG. 6, the logic flow 600 may begin with a content producer opening the syndication content 102, such as a spreadsheet document at block 602.

The logic flow 600 may provide a syndication dialog via the syndication manager component 130 from within a context for the content producing application 110 at block 604. For example, the content producer may send a control directive 104 via an input device to select a menu option to "Syndicate Content" provided by the syndication dialog. The syndication dialog may interactively lead the content producer through syndication operations with a content delivery platform, including discovering operator accounts and content delivery platforms, creating operator accounts, performing security operations such as authentication for a content producer or device, setting certain syndication features or options provided by a content delivery platform, designating whether some or all of the syndication content 102 is to be syndicated, transferring the syndication content 102 from the content producing component 110 to the content delivery platform 332, syndicating or publishing the syndication content 102 (e.g., as a part of a web feed), managing the syndication referent 120 for the syndication content 102, publishing the syndication referent 120 for others to access (via push or pull techniques) the syndication content 102 (stored as syndication resource 334), and any other syndication operations typically performed for syndicating content to an online syndication service.

The logic flow 600 may determine whether the content producer is already signed into a single operator account at diamond 606. A single operator account may comprise a sign-on service (or other unified account management technique) that allows the content producer to log into multiple websites using a single operator account. An example of a single sign-on service may comprise a WINDOWS LIVE™ ID account. When the content producer is already signed into a single operator account, a determination is made regarding whether the single operator account is associated with one or more content delivery platforms 332 at diamond 608. When the single operator account is associated with one or more content delivery platforms 332, the content producer may select an operator account for a content delivery platform 332. When the single operator account is not associated with one or more content delivery platforms 332, the syndication dialog may automatically create an operator account for a content delivery platform 332 at block 614.

The logic flow 600 may determine that the content producer is not signed into a single operator account at diamond 606. When there is an existing single operator account, the syndication dialog may automatically provide login information to the existing single operator account, or solicit login information from the content producer and provide the login information to the existing single operator account, at block 610. When there is no existing single operator account for the content producer, the syndication dialog may automatically create a single operator account for the content producer, or solicit operator information from the content producer and provide the operator information to the single sign-on service to create the single operator account for the content producer, at block 610.

The logic flow 600 may receive a control directive 104 representing whether the content producer desires to create a new operator account for the content delivery platform 332, or select an existing operator account for the content delivery platform 332, at diamond 612. The control directive 104 may cause the syndication manager component 130 to create a new operator account for the content delivery platform 332 at block 614, and select the created operator account for the content delivery platform 332 at block 616. The control directive 104 may alternatively cause the syndication manager component 130 to skip operator account generation and go directly to selecting an existing operator account for the content delivery platform 332 at block 616.

The logic flow 600 may receive a control directive 104 to syndicate one or more syndication content 102 at diamond 620. This may include, among other syndication operations, transferring the syndication content 102 from the client system 310 to the server system 330, as well as transferring one or more syndication control parameters 220 to control syndication of the syndication content 102. For instance, a syndication control parameter 220 may indicate which portions of the syndication content 102 are to be syndicated. It may be appreciated that file transfer operations may be performed in a background mode while the content producer selects syndication features offered by the content delivery platform 332 for purposes of time efficiency. This may be particularly desirable when the syndication content 102 comprises larger sets of data. Once the content delivery platform 332 receives the syndication content 102 and any syndication control parameters 220, it may perform any necessary file translation or file conversions to form the syndication resource 334, store the syndication resource 334 in a network accessible manner, send out any notifications to subscribers to the syndication resource 334, and otherwise complete the syndication process. The content delivery platform 332 may then send the syndication referent 120 for the syndication resource 334 to the syndication manager component 130.

Additionally or alternatively, it may be appreciated that any file translations or file conversions may occur before, during or after syndication. For instance, the content delivery platform 332 may perform such operations after receiving a request to access the syndication resource 334, or the content delivery platform 332 may send the syndication resource 334 to another host (such as Office Live) that when executed causes the host to translate the document into something readable by the web browser (e.g., like HTML, etc.).

When the control directive 104 provides for syndicating only one set of syndication content 102 at block 620, the syndication manager component 130 may syndicate the one set of syndication content 102 with the content delivery platform 332 to form the syndication resource 334 stored by the content delivery platform 332 of the server system 300. The content delivery platform 332 may then return a single syndication referent 120 referencing the syndication resource 334 at block 622. When the control directive 104 provides for syndicating multiple sets of syndication content 102 at diamond 620, the syndication manager component 130 may syndicate the multiple sets of syndication content 102 with the content delivery platform 332 to form multiple syndication resources 334 stored by the content delivery platform 332 of the server system 330. The content delivery platform 332 may then return multiple syndication referents 120 referencing the respective syndication resources 334 at block 624.

Once the syndication manager component 130 receives the one or more syndication referents 120, the syndication manager component 130 forwards the syndication referents 120 to the publishing component 210. The publishing component 210 may send the syndication referents 120 to the publication application 342 of the server system 340 at block 626. The publication application 342 may publish the syndication referents 120 as part of a publication, such as a blog. Users may then access the one or more syndication resources 334 using the one or more syndication referents 120. For example, a user may utilize a computer and a web browser to access a web page with a blog presenting the syndication referents 120. The user may activate one or more syndication referents 120 to view any corresponding syndication resources 334.

In various embodiments, the syndication manager component 130 (and syndication referent 120) can be accessed programmatically and thus syndication through a client can be automated. Furthermore, the syndication manager component 130 may comprise a pluggable syndication manager component that allows a vendor or a third party to add syndication features or other enhanced capabilities for various content delivery platforms. In addition, the syndication manager component 130 (and the syndication referent 120) can automatically publish the syndication content 102 to a publication application or platform, such as a user's personal page or community page (e.g., MySpace, Facebook, etc.), without the user necessarily being required to actually insert the syndication referent 120 (e.g., a URL) into the publication application or platform. The syndicated content 102 may immediately show up on a user's page without any further work from the user. It is worthy to further note that the syndication dialog may be used to generate an operator account for the content delivery platform 332, or an operator account for another system, such as a single sign-on account (e.g., from Office Live). In some cases, the content delivery platform 332 may not support operator accounts (e.g., a non-profit or free service), in which case the operator account operations may be omitted. Finally, the syndication manager component 130 may allow a user to specify which portions of the syndication content 102 to actually syndicate.

Figure 7:
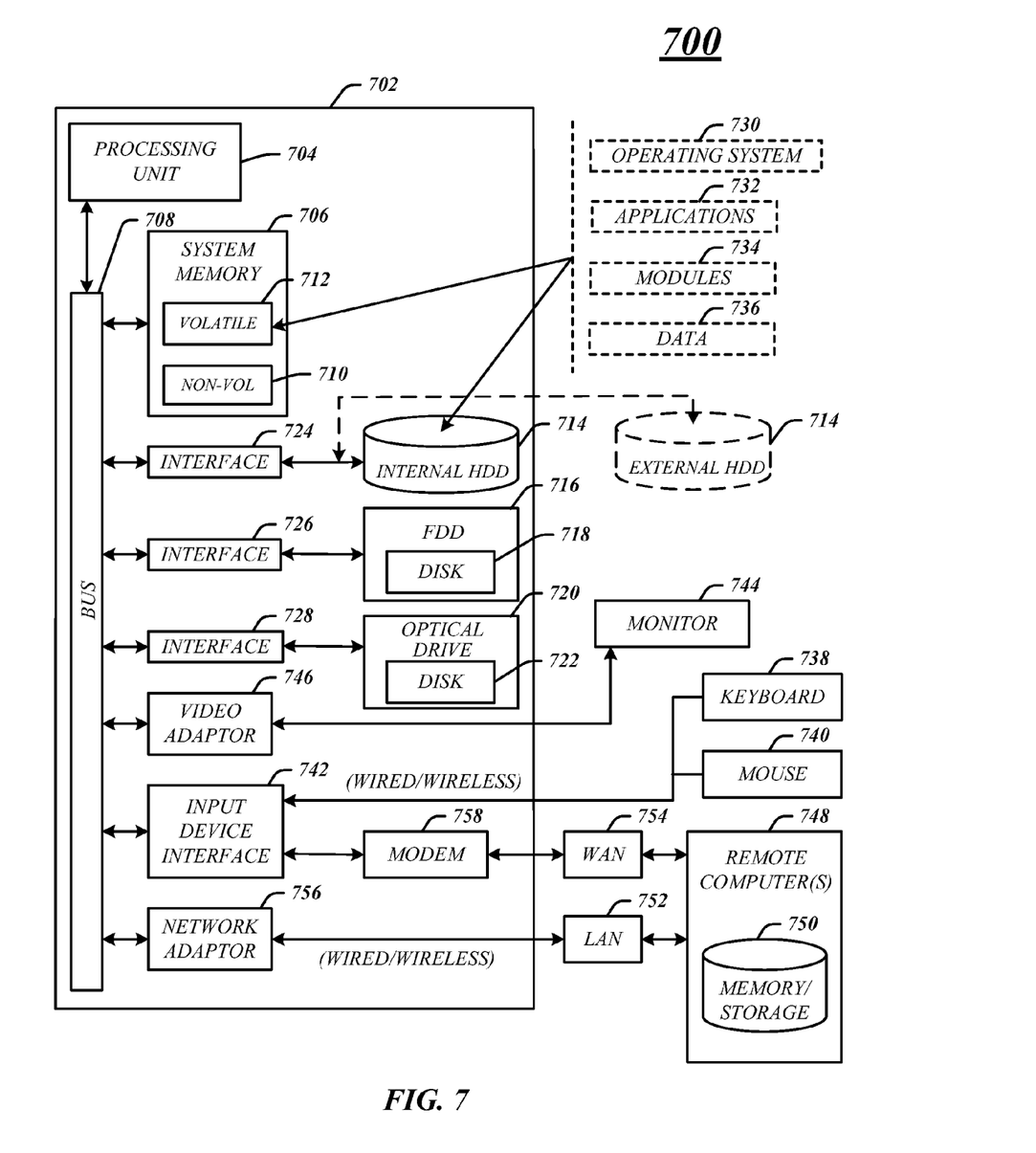
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the various elements and components of the systems 100, 200.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
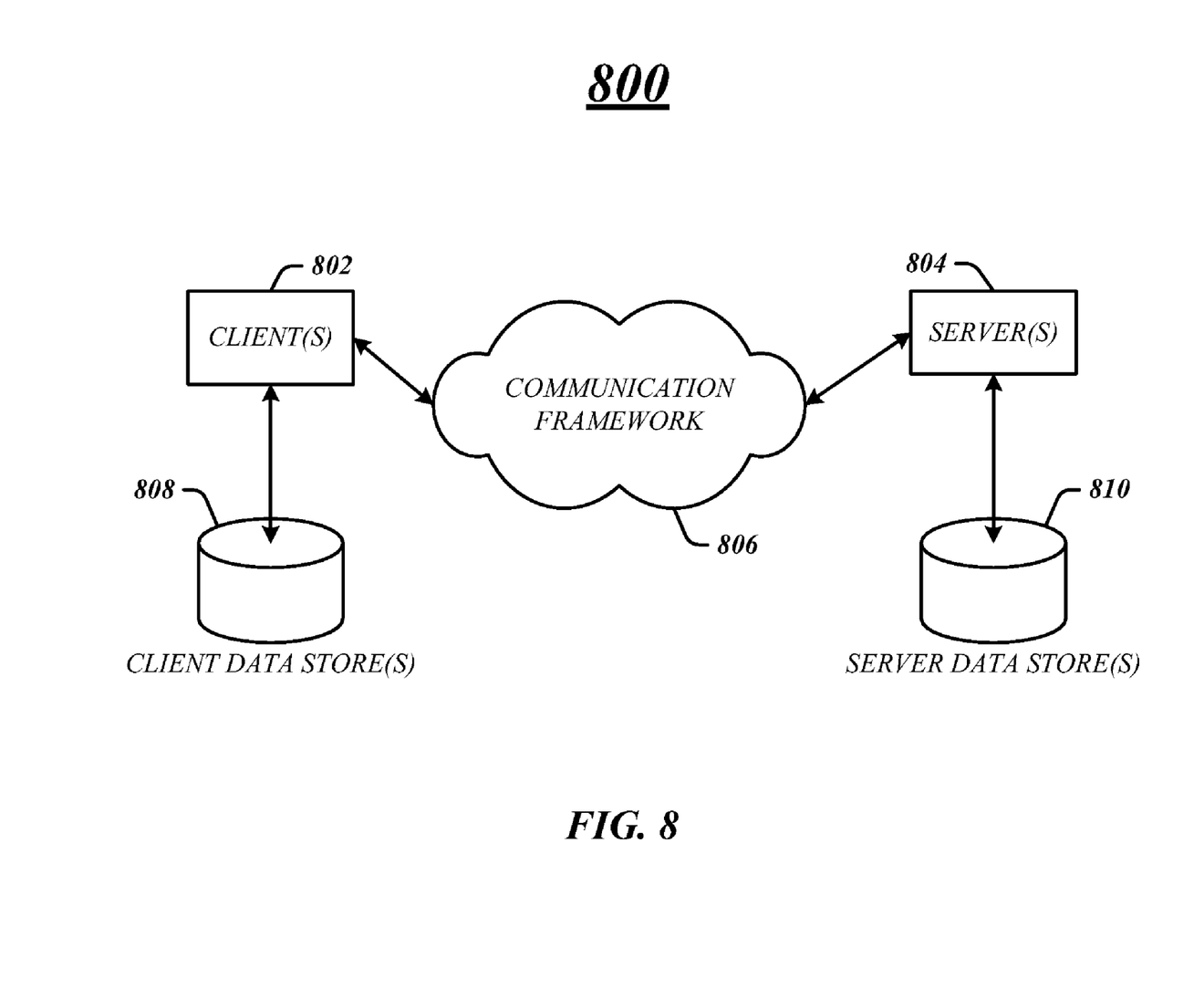
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server systems 330, 340. The clients 802 and the servers 804 are operatively connected to one or more respective client data stores 808 and server data stores 810 that can be employed to store information local to the respective clients 802 and servers 804, such as cookies and/or associated contextual information. For example, the data stores 808, 810 may store one or more sets of syndication content 102.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    receiving syndication content from a content producing component arranged for execution by a client computer, the syndication content generated or retrieved by the content producing component and comprising an electronic document or file;
    providing a syndication dialog through the content producing component to syndicate the syndication content using a content delivery platform; and
    syndicating the syndication content to form a syndication resource stored by the content delivery platform, and accessible from the content delivery platform over a network using a syndication referent.

2. The method of claim 1, comprising receiving the syndication referent arranged to provide access to the syndication resource from the content delivery platform.

3. The method of claim 1, comprising modifying the syndication content stored by the content delivery platform as the syndication resource using the syndication dialog, the modifying operations comprising republishing, updating or removing the syndication content.

4. The method of claim 1, comprising receiving a control directive from a content producer to initiate the syndication dialog through the content producing component.

5. The method of claim 1, comprising generating an operator account for a content producer with the content delivery platform for use in syndicating the syndication content by the content delivery platform.

6. The method of claim 1, comprising receiving a control directive to select an operator account for a content producer with the content delivery platform for use in syndicating the syndication content by the content delivery platform.

7. The method of claim 1, comprising performing authentication operations to access the content delivery platform through the content producing component.

8. The method of claim 1, comprising translating the syndication content from a first format to a second format suitable for syndication by the content delivery platform.

9. The method of claim 1, comprising sending syndication control parameters to control syndication operations performed by the content delivery platform from the content producing component.

10. An article of manufacture comprising a storage medium containing instructions that when executed by a processor enable a system to:
    receive syndication content from a content producing component, the syndication content generated or retrieved by the content producing component and comprising an electronic document or file;
    provide a syndication dialog through the content producing component to syndicate the syndication content using a content delivery platform;
    syndicate the syndication content to form a syndication resource stored by the content delivery platform, and accessible from the content delivery platform over a network using a syndication referent; and
    publish the syndication reference using a publishing application.

11. The article of manufacture of claim 10, further comprising instructions that when executed by the processor enable the system to receive the syndication referent arranged to provide access to the syndication resource from the content delivery platform, the syndication referent representing a link to the syndication resource accessible from the content delivery platform, the syndication referent comprising a uniform resource identifier, a uniform resource locator, a uniform resource name, executable software code, or a combination thereof.

12. The article of manufacture of claim 10, further comprising instructions that when executed by the processor enable the system to receive a control directive from a content producer to initiate the syndication dialog through the content producing component, and generate an operator account for the content producer with the content delivery platform for use in syndicating the syndication content by the content delivery platform, or receive a control directive to select an operator account for the content producer with the content delivery platform when already generated.

13. The article of manufacture of claim 10, further comprising instructions that when executed by the processor enable the system to perform authentication operations to access the content delivery platform through the content producing component, translate the syndication content from a first format to a second format suitable for syndication by the content delivery platform, and send syndication control parameters to control syndication operations performed by the content delivery platform from the content producing component to the content delivery platform.

14. An apparatus, comprising:
    a client computer having a processing system with a processor and computer-readable medium, the computer readable medium storing program instructions for a syndication manager component communicatively coupled to a content producing component arranged to be executed by the processor, the syndication manager component operative to receive syndication content from the content producing component, provide a syndication dialog through the content producing compo­nent to syndicate the syndication content using a content delivery platform, and syndicate the syndication content to form a syndication resource stored by the content delivery platform, and accessible from the content delivery platform over a network using a syndication referent, the syndication content generated or retrieved by the content producing component and comprising an electronic document or file.

15. The apparatus of claim 14, the syndication manager component operative to receive the syndication referent arranged to provide access to the syndication resource from the content delivery platform, the syndication referent representing a link to the syndication resource accessible from the content delivery platform, the syndication referent comprising a uniform resource identifier, a uniform resource locator, a uniform resource name, executable software code, or a combination thereof.

16. The apparatus of claim 14, the syndication manager component operative to receive a control directive from a content producer to initiate the syndication dialog through the content producing component, and generate an operator account for the content producer with the content delivery platform for use in syndicating the syndication content by the content delivery platform, or receive a control directive to select an operator account for the content producer with the content delivery platform when already generated.

17. The apparatus of claim 14, the syndication manager component operative to perform authentication operations to access the content delivery platform through the content producing component.

18. The apparatus of claim 14, the syndication manager component operative to translate the syndication content from a first format to a second format suitable for syndication by the content delivery platform.

19. The apparatus of claim 14, the syndication manager component operative to send syndication control parameters to control syndication operations performed by the content delivery platform from the content producing component to the content delivery platform.

20. The apparatus of claim 14, the computer readable medium storing program instructions for a publishing component communicatively coupled to the content producing component and the syndication manager component, the publishing component arranged to be executed by the processor, the publishing component operative to automatically publish the syndication referent using a publishing application executed by a server computer.

* * * * *